United States Patent [19]
Dai

[11] Patent Number: 5,781,549
[45] Date of Patent: Jul. 14, 1998

[54] METHOD AND APPARATUS FOR SWITCHING DATA PACKETS IN A DATA NETWORK

[75] Inventor: William Dai, San Jose, Calif.

[73] Assignee: Allied Telesyn International Corp., Sunnyvale, Calif.

[21] Appl. No.: 603,576

[22] Filed: Feb. 23, 1996

[51] Int. Cl.$^6$ ................................................. H04L 12/56
[52] U.S. Cl. .......................... 370/398; 370/401; 370/474
[58] Field of Search ................................. 370/300, 391, 370/392, 412, 413, 419, 422, 423, 364, 420, 398, 401, 476

[56] References Cited

U.S. PATENT DOCUMENTS

| | | | |
|---|---|---|---|
| 5,140,585 | 8/1992 | Masataka | 370/60.1 |
| 5,317,565 | 5/1994 | Crouse et al. | 370/58.2 |
| 5,408,469 | 4/1995 | Opher et al. | 370/60.1 |
| 5,412,646 | 5/1995 | Cyr et al. | 370/56 |
| 5,420,858 | 5/1995 | Marshal et al. | 370/60.1 |
| 5,428,607 | 6/1995 | Hiller et al. | 370/60.1 |
| 5,440,553 | 8/1995 | Widjaja et al. | 370/60 |
| 5,526,344 | 6/1996 | Diaz et al. | 370/364 |
| 5,610,914 | 3/1997 | Yamada | 370/395 |

OTHER PUBLICATIONS

Gronert, E., "A Building–Block Approach to LAN Switching," DATA COMMUNICATIONS, vol. 23, No. 9, 56E–56F (Jun. 1, 1994) XP0000448940.

Lin, Tzung–Pao et al., "A Platform for Seamless Interworking Among Conventional LANS and ATM Networks," Proceedings Of The Global Telecommunications Conference (Globecom), San Fran., Nov. 28–Dec. 2, 1994, IEEE pp. 296–301 (Nov. 28, 1994)XP0000488561.

Chao, H.J. and Smith, D.E., "A Shared–Memory Virtual Channel Queue for ATM Broadband Terminal Adapters," International Journal of Digital And Analog Communication Systems, vol. 5, 29–37 (1992) XP000609993.

Saunders, S., "Newcomer Takes a New Tack on LAN Switching Nicecom says its Nicell ATM/Ethernet switches deliver high performance for a nice price," DATA Communications, vol. 23, No. 13, 37–38 (Sep. 1994) XP000465387.

3Com: SuperStack, "LinkSwitch Family Workgroup Switches and Modules", Jul. 1995, pp. 1–10.

Primary Examiner—Hassan Kizou
Assistant Examiner—A. Bnimoussa
Attorney, Agent, or Firm—McCutchen, Doyle, Brown & Enersen

[57] ABSTRACT

A local area network switch which implements packet segmentation and reassembly for cell-based switching on a backplane cell bus. A plurality of packet processing units are each coupled to a backplane cell bus wherein each packet processing unit hosts a plurality of local area network ports. Each packet processing unit is associated with a single packet buffer memory that is shared by the ports associated with the packet processing unit. The segmentation of local area network packets into fixed-size cells facilitates an efficient local area network switch which provides dedicated bandwidth for each of the ports associated with the switch. There is also provision for coupling the local area network ports to communicate with a high-speed network interface.

15 Claims, 10 Drawing Sheets

METHOD AND APPARATUS FOR SWITCHING DATA PACKETS IN A DATA NETWORK

BACKGROUND OF THE INVENTION

1. Field of the Invention

The present invention relates to data communications in computer networks. More particularly, the present invention relates to local area network switching techniques utilizing a cell-based architecture.

2. Background

Local area networks, or LANs, have today become an essential tool in enterprises utilizing computing machinery. Early LAN implementations were based on a bus architecture in accordance with various protocols, such as Ethernet (IEEE 802.3), Token Ring (IEEE 802.5), or other protocols. The bus-based architecture of early LANs utilized a shared bandwidth bus for coupling each of the nodes to the network. For example, an early Ethernet network could comprise a plurality of end-stations sharing a total of 10 Mbps (megabits per second) available bandwidth.

To simplify the wiring needs for local area networks and to exploit existing wiring structures in many office buildings, network designers implemented devices known as network hubs or concentrators. In the simplest form, early hubs essentially shrunk the bus to which the network components connected to the size of a box fitting in a single closet. Terminals, or end-stations connecting to the network, were generally capable of connecting to existing building wiring, such as unshielded twisted pair (UTP) wiring found in many office buildings for connecting to a centralized hub in the central wiring closet.

The early network hubs designed for use by the various local area network protocols still implemented a shared-bandwidth architecture. As user demands have increased, the shared bandwidth architectures of many LANs existing today have reached their limits. A number of technologies are being studied for increased bandwidth protocols, but there exists today a large installed base of LAN equipment and systems compatible with that equipment which would be advantageously served by a near term increased bandwidth solution.

One emerging technology that is fast finding widespread use in the computing industry is the implementation of LAN switches. LAN switches can be based on existing network protocols such as Ethernet, Token Ring and FDDI and are thus compatible with existing network systems. Switching directs network traffic in a very efficient manner. It sends information directly from the port of origin to only its destination port, not wasting traffic in broadcasts to every possible destination. Switching increases network performance, enhances flexibility and eases configuration changes.

In their simplest configuration, LAN switches are fast multiport bridges operating at the MAC level two of the data link layer level in the OSI seven layer networking model. Switching technology enables some key benefits over traditional LAN networks. First, a 10 Mbps (megabits per second) or 100 Mbps shared media can be changed to 10 Mbps or 100 Mbps of dedicated bandwidth per connection. Switches enable the connection of either a shared segment (a workgroup) or a dedicated user to each port. Further, this can be accomplished without modifying software or hardware already running on the work stations. This preserves an initial investment in older network technology and allows a migration path based on familiar, well-proven technology with little or no impact on the existing network operating systems.

LAN switches are a recent development and many early devices are targeted for small workgroups with four to eight nodes to be attached to a given switch. It is desirable, and therefore and object of the present invention, to extend the capabilities of a local area network switch to provide dedicated bandwidth to increased numbers of ports utilizing an efficient, scaleable architecture.

SUMMARY OF THE INVENTION

From the foregoing, it can be appreciated that switching technology for local area networks is a critically important emerging technique to handle the increasing bandwidth demand in existing network implementations. The present invention is described with respect to an exemplary embodiment of an Ethernet cell-based switch. It will be clear that the present invention may be practiced using other protocols than Ethernet and that the cell-switching techniques may be implemented in devices other than a network workgroup switch.

The present invention is described in an exemplary embodiment to be incorporated into an Ethernet workgroup switch. The Exemplary workgroup switch provides 24 Ethernet ports and one high-speed network interface. The 24 Ethernet ports are grouped into three sets of eight ports, each set being associated with a packet processing unit. The packet processing units are responsible for receiving Ethernet packets, segmenting them into fixed-size cells and conveying them on a backplane cell bus incorporated within the work group switch.

Each packet processing unit in the workgroup switch has associated with it a packet buffer memory. Each packet processing unit monitors traffic on the cell bus and collects all the cells transmitted thereon for reassembly into Ethernet packets in the packet buffer memory. The packet buffer memory is a shared memory to the extent that it relates to the group of eight ports associated with a single packet processing unit, however the packet buffer memories are distributed to the extent that there is one dedicated for each of the packet processing units. Each received Ethernet packet is reassembled in each packet buffer memory because the destination port for the received packet may be one or several ports associated with one or several of the packet processing units.

Also coupled to the cell bus is a switch packet routing controller which monitors cell traffic on the cell bus. For each packet that is received, the switch packet routing controller analyzes the packet to determine which ports, if any, the packet is to be output from. The switch packet routing controller propagates a control cell on the cell bus directing each of the packet processing units how to "route" each packet being assembled thereby. The switch packet routing controller also has associated therewith a routing table memory which collects information on received packets for creating a routing table associating each port with addresses to which it is in communication.

The exemplary Ethernet workgroup switch also includes a high-speed network interface. This may be used for a high-speed port, such as an ATM port or other high-speed protocol connection. The high-speed network interface is coupled to a high-speed internal bus, such as a PCI bus, which is in communication with the cell bus through a bus bridging controller. The bus bridging controller also has associated with it a packet buffer memory that operates in a manner similar to the packet buffer memories associated with each of the packet processing units.

There is also provided a backplane control bus referred to as a Management Information Base (MIB) bus which collects port status data count information.

A memory space model is implemented which provides for the packet buffer memories to be shared by each of the ports associated with a particular packet processing unit. Each packet in a given packet buffer memory is only reassembled once, with fields specifying the number of ports for the associated packet processing unit to output the packet onto with a counter mechanism to make sure the packet is maintained until it has been output on all designated ports. This supports both broadcast and multicast packets in an efficient manner.

Other aspects of the present invention include an adjustable switching cut-through latency control feature which can be used to specify how much of a packet needs to be received and assembled in a packet buffer memory before it can start to be retransmitted through a port associated with the memory's packet processing unit.

BRIEF DESCRIPTION OF THE DRAWINGS

The objects, features and advantages of the present invention will be apparent from the following detailed description in which.

DETAILED DESCRIPTION OF THE INVENTION

Methods and apparatus are disclosed for a network communications device which implements a cell-based switching architecture. Although the present invention is described predominantly in terms of an exemplary embodiment in which an Ethernet workgroup switch utilizes cell-based techniques, the concepts and methods disclosed herein are broad enough to encompass other network communications devices where it is desirable to implement cell-based switching. The present invention is not limited to the Ethernet embodiment described with respect to the exemplary embodiment, but may in fact be applied to other network communications protocols. Throughout this detailed description, numerous specific details are set forth such as packet protocols and cell sizes, etc., in order to provide a thorough understanding of the present invention. To one skilled in the art, however, it will be understood that the present invention may be practiced without such specific details. In other instances, well-known control structures and circuit diagrams have not been shown in detail in order not to obscure the present invention.

In many instances, components implemented within the present invention are described at an architectural and/or functional level. Those of ordinary skill in the art will recognize that the architectures described with respect to the present invention may be implemented utilizing various technologies such as application specific integrated circuits (ASICs), programmed logic, or software running on a form of microprocessor or microcontroller. Those skilled in the art will understand that the present invention is not limited to any one particular implementation technique and that once the functionality to be carried out by such components is described herein, those of ordinary skill in the art will be able to implement the invention with various technologies without undue experimentation. An Exemplary Ethernet Workgroup Switch Referring now to FIG. 1, there is shown a portion of a network system which incorporates an exemplary embodiment network switching apparatus in accordance with the present invention. The exemplary network communication device 100 is an Ethernet workgroup switch designed to be compliant with 10 Mbps (megabit per second) Ethernet, also referred to as standard IEEE 802.3. The exemplary Ethernet switch 100 includes 24 ports 101–124 for coupling to either individual data terminal equipment (DTE) units such as DTEs 130 and 132 or to additional network segments, such as the Ethernet network segment 140, which is itself coupled to three respective DTEs 141, 142 and 143. The Ethernet switch of FIG. 1 in accordance with an implemented embodiment of the present invention also includes a high-speed network interface (shown used as high-speed port 150) for providing communication between the ports 101–124 and a high-speed network, such as the ATM network 160. The high-speed network interface may be used to communicate with other high-speed network protocols or used to cascade together more than one device 100.

Figure 1:
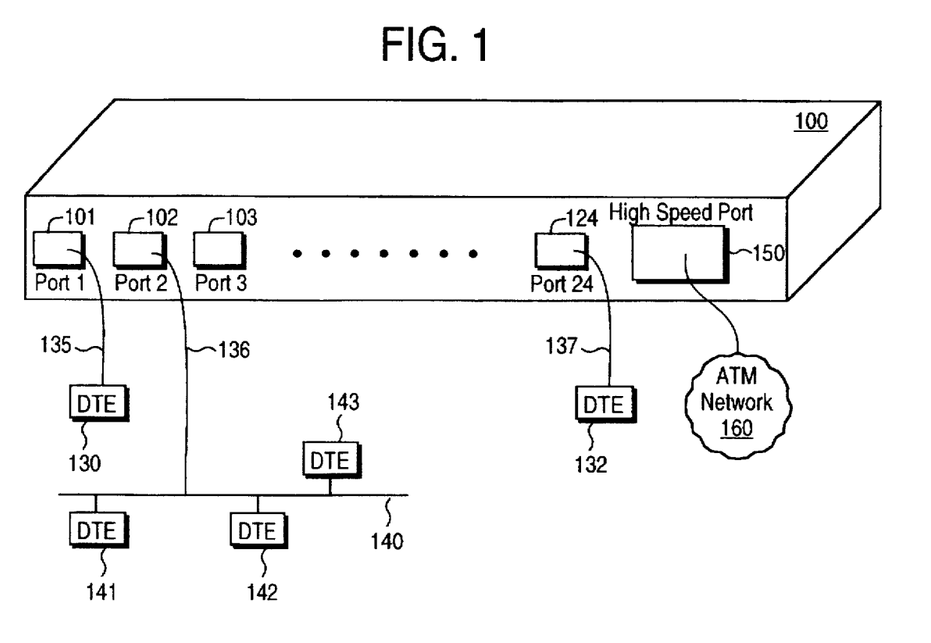
FIG. 1 illustrates a portion of a network architecture incorporating an exemplary embodiment network switch in accordance with the present invention.

By introducing the Ethernet switch 100 into the portion of the illustrated network, rather than a traditional repeater, greater network efficiency and speed may be achieved. Many networks are experiencing bandwidth shortages. There are several reasons for this, including an increase in traffic due to the shear number of networked users, the amount of data transported between client/server applications and the inefficient traffic patterns of some networks. Switching directs network traffic in a very efficient manner - it sends information directly from the port of origin to only its destination port. Thus, although the Ethernet switch 100 is incorporated in a 10 Mbps Ethernet implementation, it is not necessary for each of the users of the network to share a total of 10 Mbps bandwidth as would be the case if a repeater were used in place of the Ethernet switch 100. Accordingly, each of the ports 101–124 is provided with a dedicated bandwidth of 10 Mbps to each of the links such as those respectively shown as 135, 136 and 137. While it might be suitable for users 141, 142 and 143 to share the bandwidth available on network segment 140, network users 130 and 132 who may be "power users" are able to respectively benefit from a dedicated 10 Mbps bandwidth.

Figure 2:
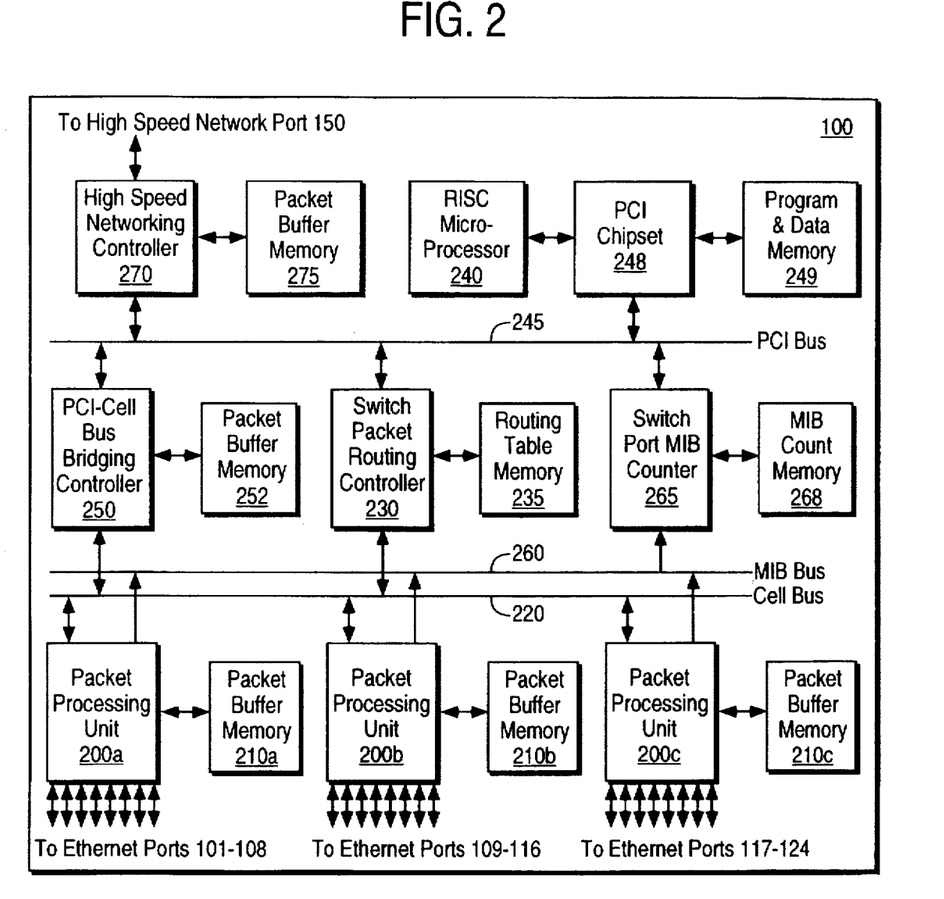
FIG. 2 illustrates a block diagram of the architecture of the exemplary network switching apparatus incorporating numerous aspects of the present invention.

Referring now to FIG. 2, there is illustrated a block diagram of the overall architecture of an implemented embodiment of the Ethernet switch 100 implementing various aspects of the present invention. As noted with respect to FIG. 1, the Ethernet switch 100 comprises 24 Ethernet ports 101–124. In accordance with the illustrated architecture shown in FIG. 2, it can be seen that the 24 Ethernet ports of the exemplary embodiment Ethernet switch are divided into three groups of eight ports. Each group is associated with a single packet processing unit, 200a, 200b or 200c, each of which is respectively associated with a shared packet buffer memory 210a, 210b or 210c. The packet buffer memories 210 are referred to as shared packet buffer memories, which as will be seen further herein, refers to the fact that the 8 local ports serviced a by single packet processing unit 200 are respectively served by a single one of the packet buffer memories 210.

The packet processing units 200 are each connected through a cell bus 220. Also coupled to the cell bus 220 is a switch packet routing controller 230 and an associated routing table memory 235. A minimal working Ethernet switch core could be assembled using at least one of the packet processing units 200, the switch packet routing controller 230, the cell bus 220, and the associated memories 210 and 235 for the packet processing unit and switch routing controller, respectively. The exemplary embodiment Ethernet switch also incorporates a microprocessor 240 in communication with a I/O bus (PCI bus) 245 through a PCI chip set 248. The microprocessor 240 is serviced by local storage memory 249. The microprocessor 240 is provided for local computing such as network management (SNMP), etc. The PCI bus 245 is coupled to the cell bus 220 through a PCI/cell bus bridging controller 250, which is associated with its own packet buffer memory 252.

The exemplary Ethernet switch 100 illustrated in FIG. 2 also incorporates a Management Information Base (MIB) bus 260 designed to carry switch port MIB information from each of the packet processing units 200 to a switch port MIB counter 265 for accumulating the appropriate MIB counter information for the network management agent running on the microprocessor 240. The switch port MIB counter 265 has associated with it a MIB count memory 268.

As was described with respect to FIG. 1, the Ethernet switch 100 includes a high-speed interface for communicating with a high-speed network, such as the ATM network 160 through a high-speed port 150. Thus, the architecture illustrated in FIG. 2 incorporates a high-speed networking controller 270 for controlling data flow between the switch 100 and the high-speed network 160. The Ethernet switching controller 270 communicates with the PCI bus 245 and is associated with a packet buffer memory 275. The interaction between the high-speed networking controller 270 and the packet processing units 200 will be described more fully further herein.

Packet Segmentation and Reassembly

Much of the following information relates to circuitry implemented in the packet processing units 200 for handling data packets and the interaction of the packet processing units 200 with the cell bus 220.

The switching architecture in accordance with the present invention is a cell-based architecture. Data packets, such as Ethernet packets, are received on a local port of one of the packet processing units 200. The data packets are segmented into fixed-size cells and propagated on the cell bus 220. The cell bus 220 is coupled to each of the packet processing units which receive the fixed-size cells from the cell bus for packet reassembly in an associated packet buffer memory 210. The format for the fixed-size cells to be transmitted on the cell bus 220 will be described in detail further herein with respect to FIG. 5, but in accordance with an implemented body of the present invention, each cell is defined to be 60 bits in length, 12 bits comprising the cell header information and a 48-bit data unit payload from the segmented Ethernet packet.

Figure 3:
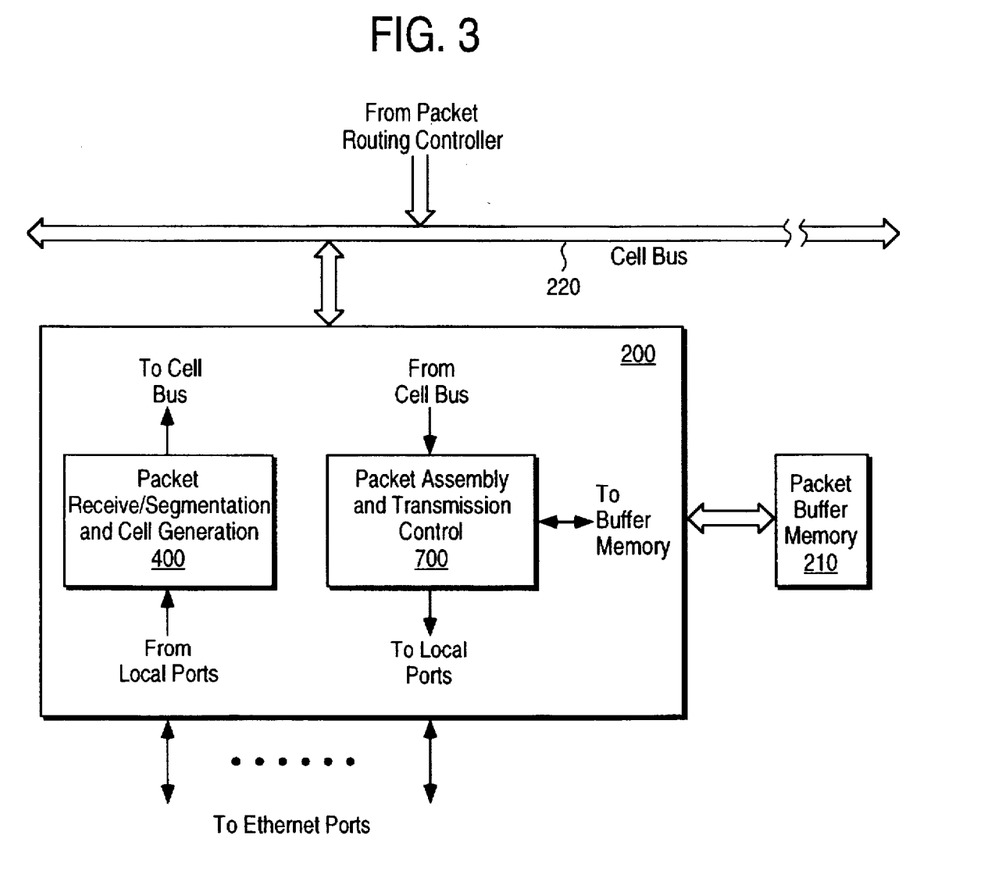
FIG. 3 illustrates a more detailed block diagram of a portion of the network switching apparatus for segmenting and reassembling data packets in association with a backplane cell bus and a shared packet buffer memory.

FIG. 3 illustrates a general block diagram of a packet processing unit 200. It can be seen at the functional blocks of the packet processing unit 200 can be broken into two distinct operative sections. Block 400, which will be described in further detail herein with respect to FIG. 4, is responsible for receiving Ethernet packets from one of the Ethernet ports associated with the packet processing unit 200 and segmenting the packet into fixed-size cells for transmission on the cell bus 220.

The other major component of the packet processing unit 200 is the packet assembly and transmission control logic 700, which will be described in detail further herein with respect to FIG. 7. The packet assembly and transmission control logic 700 receives cell traffic from the cell bus 220, which includes both segmented data packets received on either one of the local Ethernet ports or through the high-speed network interface as well as control cells propagated by the switch packet routing controller 230. Responsive to information contained in the control packets from the routing controller 230, the packet assembly and transmission control logic 700 will direct the storage of the cell traffic in an appropriate location in the buffer memory 210 for reassembly of data packets for retransmission if they are to be retransmitted from one of the Ethernet ports associated with the particular packet processing unit 200. The memory space organization for the packet buffer memory 210 will be described further herein with respect to FIG. 8.

Figure 4:
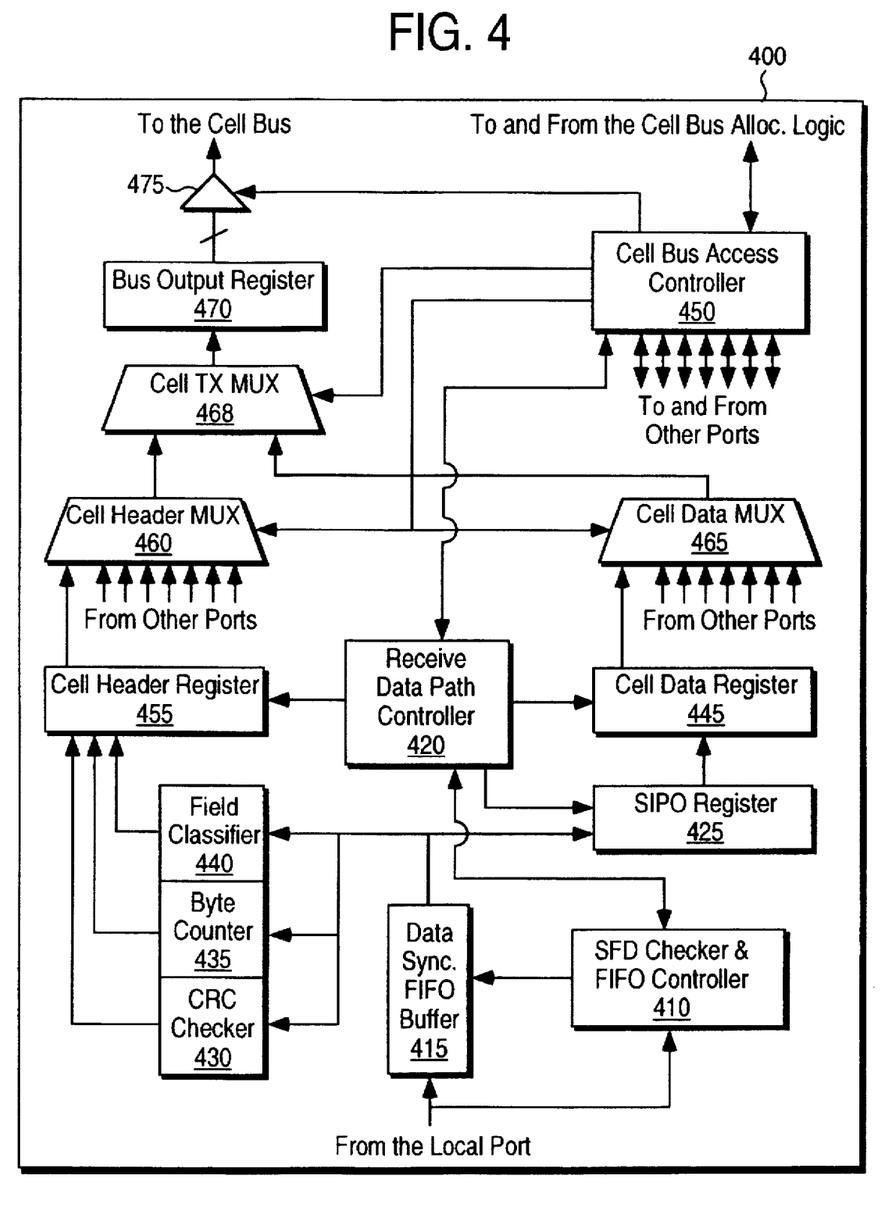
FIG. 4 illustrates a more detailed block diagram of the circuitry responsible for segmenting data packets into fixed-size cells and propagating them onto the cell bus.

FIG. 4 illustrates a more detailed block diagram of the packet receive/segmentation and cell generation logic 400. When a packet is received from a local port by the packet processing unit 200, the SFD checker 410 will first search for the SFD field from the Ethernet packet preamble to locate the data portion of the packet. The SFD field checker will directs its FIFO controller portion to write the data bit stream into the FIFO buffer 415 to be synchronized with the packet processing unit internal operation. When the FIFO 415 is not empty, the Receive Data Path Controller 420 will direct the FIFO controller 410 to read the data bit stream out of the FIFO buffer 415, shifting the data into the 48-bit serial-in/parallel-out (SIPO) register 425.

Concurrent with segmenting the data payload, the CRC checker 430 will start calculating CRC information from the data bit stream and check whether a CRC error occurs at the last byte boundary in the bit stream. The byte counter 435 will count the number of bytes in the bit stream, while the field classifier 440 will divide the bit stream into cell data and classify the cell data into one of four data types: destination address, source address, cell data not ending the packet, and cell data at the end of the packet. If any receive errors are detected by the CRC checker, the error will be indicated as error status in the cell header, as well.

When the SIPO register 425 is full, the receive data path controller 420 will direct the cell data register 445 to load data from the SIPO register 425 and will notify the cell bus access controller 450 to generate a cell bus 220 access request on behalf of the associated local port. Meanwhile, the receive data path controller 420 will instruct the cell header register 455 to load information from the CRC checker 430, the byte counter 435, and the field classifier 440 to generate the appropriate cell header. If any kind of receive error is detected, such as a runt packet or Frame-TooLong CRC error or alignment error, the cell type will be marked as a receive error type instead of the type identified by the field classifier 440.

After the cell bus access controller 450 receives an acknowledgment for access to the cell bus 220, the cell bus access controller 450 will select through the cell header multiplexer (MUX) 460 and the cell data MUX 465, the appropriate cell header and cell data among all the ports that have requested access to the cell bus 230. The appropriate header and data will be transferred as a complete cell on to the cell bus 220 in two successive clock cycles, 30 bits at a time. The transfer to the cell bus is done through the cell transmission (TX) MUX 468. The bus output register 470 and tri-state output buffer 475 are used to synchronize transmission of data cells with the cell bus clock. Once the port selection has been made by the cell bus access controller 450, the corresponding bus request will be cleared immediately to keep the bus access pipeline running.

Figure 5:
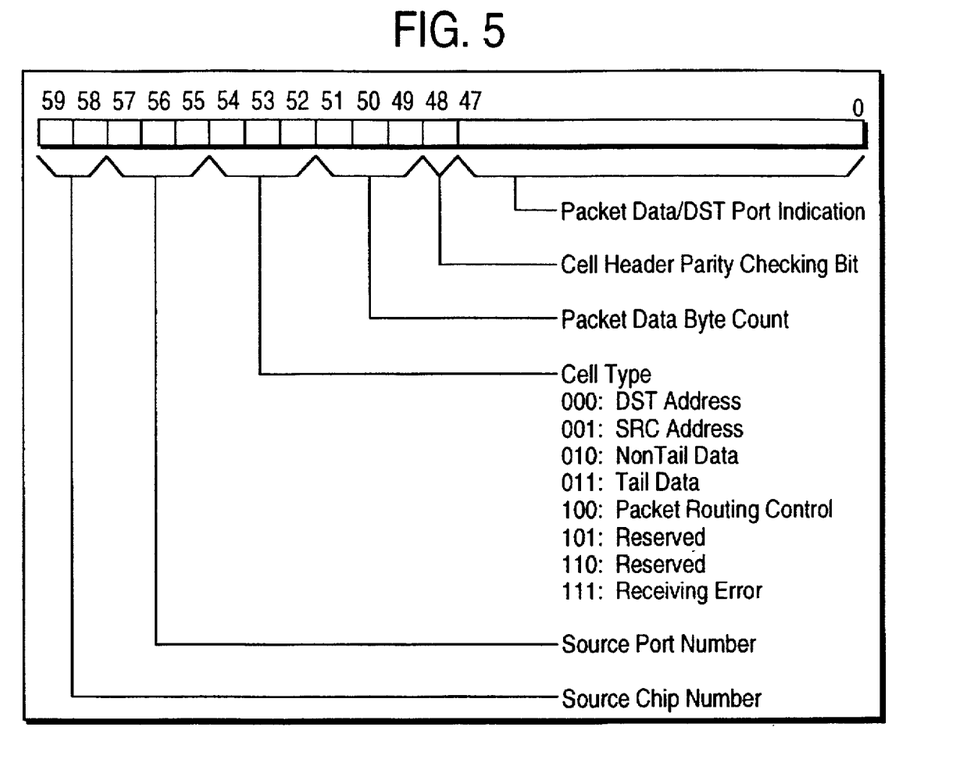
FIG. 5 illustrates the bit assignments for the fixed size data cells in accordance with the present invention.

Referring now to FIG. 5 there is shown the cell definition for cells to be transmitted on the cell bus 220. Each cell is defined as a 60-bit data unit, which is transferred on the cell bus 220 to carry packet data or packet routing control information to every device connected on the bus. In accordance with an implemented embodiment of the present invention, it takes two system clock cycles to send a data cell on the cell bus with bits 59–30 being sent first and bits 29–0 being sent second. The format for the cell bit assignments illustrated in FIG. 5 is with respect to an exemplary embodiment of the present invention. The source chip number (bits 59–58) combined with the source port number (bits 57–55) specify the local port from which the packet data carried in the cell is received. For a packet processing unit, the source chip number is specified by its BCN configuration and will be either "00", "01", or "10". A setting of "11" is reserved for the bridging controller 250. The source port number range is from "000" through "111" to represent in binary the local ports 1 through 8, respectively.

The cell type field (bits 54–52) specifies the type of field contained in the cell. A setting of "000" specifies the cell contains destination address information; "001" specifies the cell contains the packet's source address field; "010" specifies the cell contains embedded data not ending a packet; "011" specifies the data field ending a packet; "100" specifies the packet routing control information; "111" indicates that a receiving error has occurred; and in accordance with the implemented embodiment; "101" and "110" are reserved cell types.

The packet data byte count field (bits 51–49) specifies the number of bytes which are really carried by the cell. This field may range from "001" to "110". For a packet routing control cell, this field has no meaning.

The cell header parity checking bit (bit 48) is used to protect bit 59 through bits 49 of a cell. It is set so that the number of "1" s in the 12-bit header field including itself, is even.

The packet data/DST port indication field (bits 47–0) comprise 48 bits for carrying packet data when the cell is not a packet routing control cell. Earlier received data bits are put in higher order bit spaces and later received data bits are put in lower order bit spaces. When the cell is a packet routing control cell, bit 47 indicates whether the destination address is found. A "1" indicates that the destination address is found and a "0" indicates that it is not found. For the packet routing control fields, bits 26 through zero indicate whether the packet should be transmitted through the corresponding port. Bit 26 is used for the high-speed network port. Bits 25 and 24 are reserved in accordance with the implemented embodiment of the present invention for use by network management software or for other functions. Bits 23–16 correspond to local ports 8–1 of the packet processing unit with a BCN of "10". Bits 15–8 are for local ports 8–1 of the packet processing unit with a BCN of "01" and bits 7–0 are for the local ports 8–1 of the packing processing unit with BCN of "00". A "1" in a given bit position indicates that the packet associated with the cell destination address should be transmitted through the local port corresponding to the bit position. A "0" means not to transmit out of the associated port. Thus, it can be seen that a packet can be destined to be output from more than one port and the output ports may be associated with more than one packet processing unit 200.

As described above, when a fixed-size cell is to be transmitted over the cell bus 220, the transmission is carried out by first sending half of the cell and then sending the second half of the cell. The cell bus 220 is designed to function in conjunction with the packet routing controller 230 as described above with respect to FIG. 2. The routing controller 230 generates the packet routing information and is responsible for allocating the cell bus cycles. In accordance with the implemented embodiment described above with the respect to FIG. 2, all the devices connected to the cell bus are synchronized with a system clock running in the one embodiment at 20 Mhz (megahertz). More specifically, the signals on the cell bus are asserted at the rising edge of the clock and are Latched by each device at the rising edge of the clock. Further, in accordance with the implemented embodiment, each packet processing unit 200, the bridging unit 250 and the routing controller 230 are synchronized on a 10 Mhz bus cycle, which is defined as two system clock cycles.

When a packet processing unit 200 has a cell to transmit on the cell bus 220, it will assert a bus request signal to the routing controller 230. The routing controller 230 will send back an acknowledge signal to one of the packet processing units 200 according to its bus cycle allocational arbitration schemes. Upon receiving an acknowledgment, the packet processing unit 200 will transmit its cell onto the cell bus and de-assert its bus request signal. The bus cycle allocation logic incorporated in the routing controller 230 must cooperate with the packet processing unit bus arbitration logic to form a synchronized pipeline so that no bus cycles are lost because of bus arbitration overhead.

Figure 6:
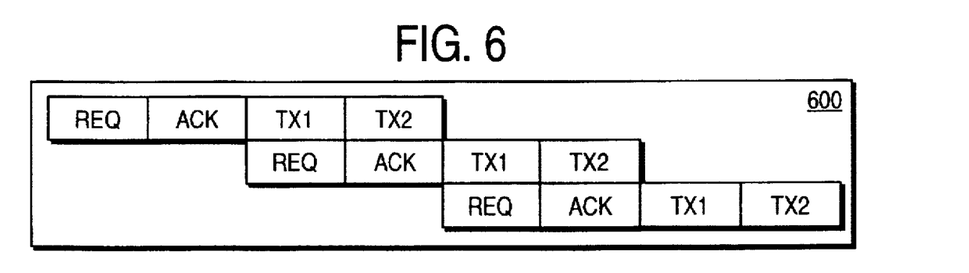
FIG. 6 illustrates a timing diagram for accesses to the backplane cell bus shared by the packet processing units.

FIG. 6 illustrates the pipeline structure for cell bus accesses. There are 4 stages in the pipeline: REQ Stage, ACK Stage, TX1 Stage and TX2 Stage. Each stage is triggered at the rising edge of the 20 Mhz bus clock. In time scale, a current REQ and ACK stages overlap previous TX1 and TX2 stages, respectively.

In the REQ(TX1) stage, the packet processing unit 200 that has a cell or cells ready to be sent over the cell bus 220 will asset its bus request signal to bus cycle allocation logic within the routing controller 230 which will evaluate all the bus request signals received to generate an appropriate acknowledgment signal to be sent to the appropriate packet processing unit at the next ACK stage. Meanwhile, the previously-acknowledged bus requesting unit will be transmitting the first half of its cell.

In the ACK(TX2) stage, the bus cycle allocation logic of the routing controller 230 will send out an acknowledge signal to a selected bus requesting unit. Each bus requesting unit will check whether its bus request is acknowledged and reevaluate its request, depending on whether it has more than one cell ready to be sent. If the request is acknowledged, and there is only one cell ready to be sent, it will de-assert its bus request signal at the next TX1 stage. Otherwise, it will maintain its bus request signal in an asserted state. Concurrently, the previously-acknowledged unit will complete transmitting the second half of its cell.

In the TX1 (REQ) stage, the acknowledged unit will transmit the first half of a waiting cell, while the bus cycle allocation logic of the routing controller is evaluating the next request signals from all the bus requesting units in order to generate an appropriate acknowledge signal at the next TX2 stage.

In all cases, each unit cascaded on the cell bus will latch in the signals on the bus at the rising edge of the bus clock.

Like the packet processing units 200, the routing controller 230 itself is a device connected to the cell bus 220. Internally, it only takes the address information cells for searching its routing table for the destination port(s) and to learn the source address information for table maintenance within its routing table 235. This information will be kept in the routing table memory 235 which assembles a map indicating which local ports correspond to which source addresses. When the routing controller 230 has a control cell to send with output port information, it will request from its own allocation logic a bus cycle and send out the routing control cell once the request is acknowledged.

Figure 7:
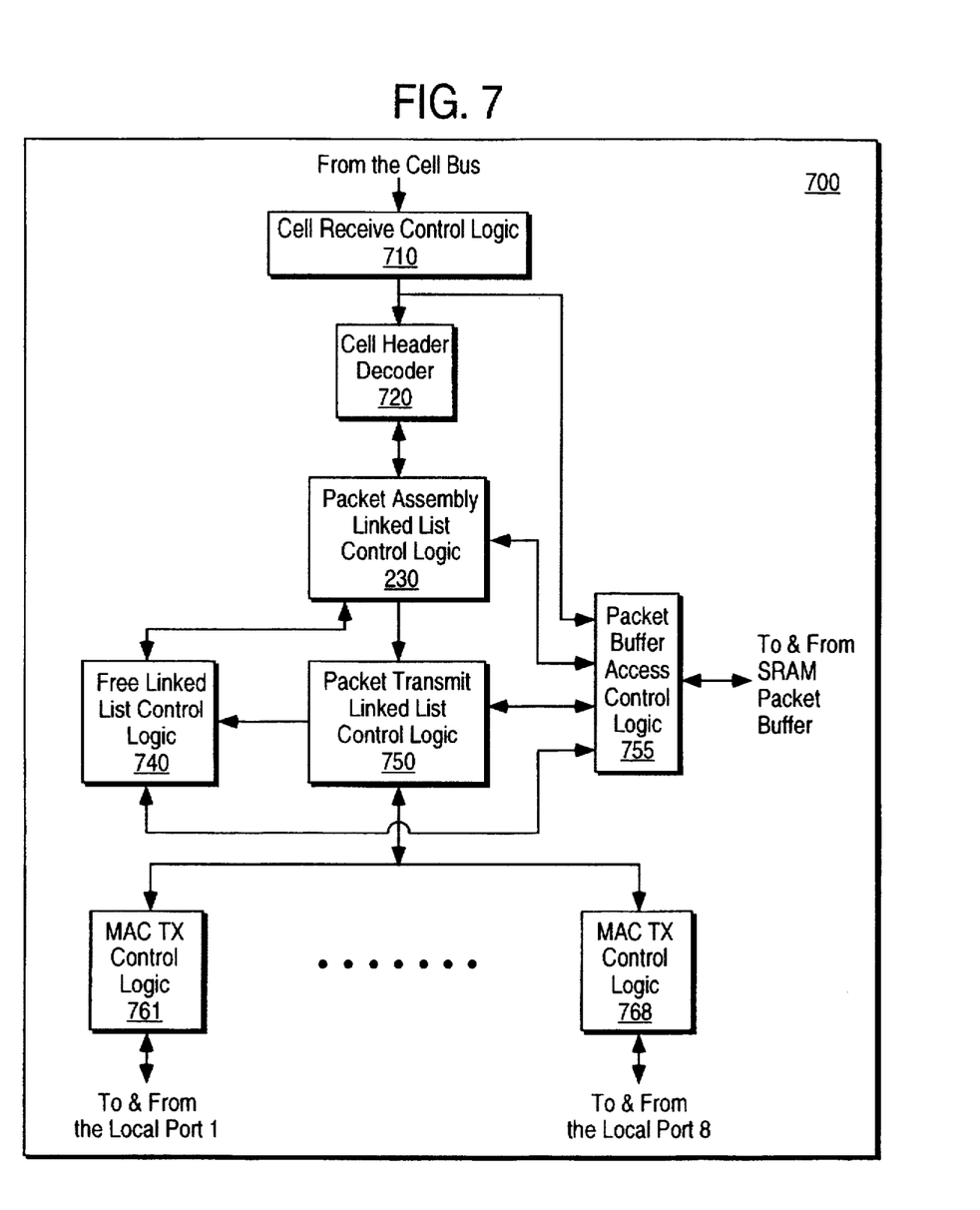
FIG. 7 illustrates the circuitry for packet reassembly and transmission, utilizing a shared packet buffer memory.

Referring now to FIG. 7, there is illustrated a more detailed block diagram for the circuitry for packet reassembly and transmission control logic 700 referred to above with respect to FIG. 3. When there is a cell transfer on the cell bus 220, the cell receive control logic 710 will latch the cell from the bus. Cell header decoder logic 720 is provided to decode the cell header for generating the appropriate control signals for the packet assembly operations. The packet assembly linked list control logic 730 comprises 25 packet assembly lines for 24 ten Mbps low speed packet data flow packets and a single high-speed packet data flow, respectively. When a cell is received from the cell bus 220, the cell header decoder 720 will find the appropriate packet assembly line according to the source information in the cell header and direct the packet assembly line to do the appropriate operations based on the other information contained in the cell header which is described more fully above.

When a packet data cell is received, the corresponding packet assembly line will locate a buffer space in the corresponding packet buffer memory 210 to store the data. If the last buffer block in the assembly line is full, or there is no buffer block in the assembly line, the packet assembly linked list control logic 730 will request the free linked list control logic 740 to allocate a free buffer block to be attached to the assembly line. The data will then be stored in the first available data word space in the block just attached. Otherwise, the data will be stored in the first available data word space of the last block in the assembly line. The packet buffer memory space model will be described more fully below with respect to FIG. 8.

After a block is finished with data storage, the packet assembly line for a given packet will maintain the information about the block data, and the next block pointer (if it is not the last block for the packet), and arbitrates for access to the packet buffer memory 210 to update the block header.

If no free buffer block can be allocated by the free linked list control logic 740, the packet assembly linked list control logic 730 will set a mark for the affected assembly line indicating that the buffer is full and the assembly line will return all the blocks attached thereto to a free block pool with corresponding pointers released to the linked list control logic 740. The rest of the data cell for the particular assembly line will be dropped until the next data cell having the corresponding DST address for this assembly line is received and a buffer block can be allocated. The above-noted mark will then be reset.

When a received cell header indicates a receiving error, and if the packet being assembled on the assembly line has not yet been submitted for transmission, the corresponding packet assembly line will return all the memory blocks linked on the assembly line back to the free linked list and discard the packet. Otherwise, the receiver error information will be provided to the corresponding transmission line to which the packet has been submitted.

When a routing control cell from the switch packet routing controller 230 is received, the packet assembly line identified by the routing control cell will be modified in the associated packet buffer memory with the information provided by the routing control cell such as the various destination ports for transmission of the packet.

The packet transmit linked list control logic 750 maintains 8 packet transmission lines for each of the 8 local ports respectively associated with the packet processing unit 200. Each packet transmission line communicates with its associated media access controller (MAC) 761-768 to transmit packets submitted by the packet assembly linked list control logic 750. Once a packet has been transmitted from each of its destination ports, the transmit linked list control logic 750 provides a signal to the free linked list control logic 740 to free the memory space in the packet buffer memory 210 for reallocation. It also frees the linked list pointers back to a free pool maintained by the linked list control logic 740 upon successful packet transmission.

Accesses to the packet buffer memory 210 associated with the packet processing unit 200 are handled by packet buffer access control logic 755, which operates in accordance with the principles described above.

Packet Buffer Memory Organization

Figure 8:
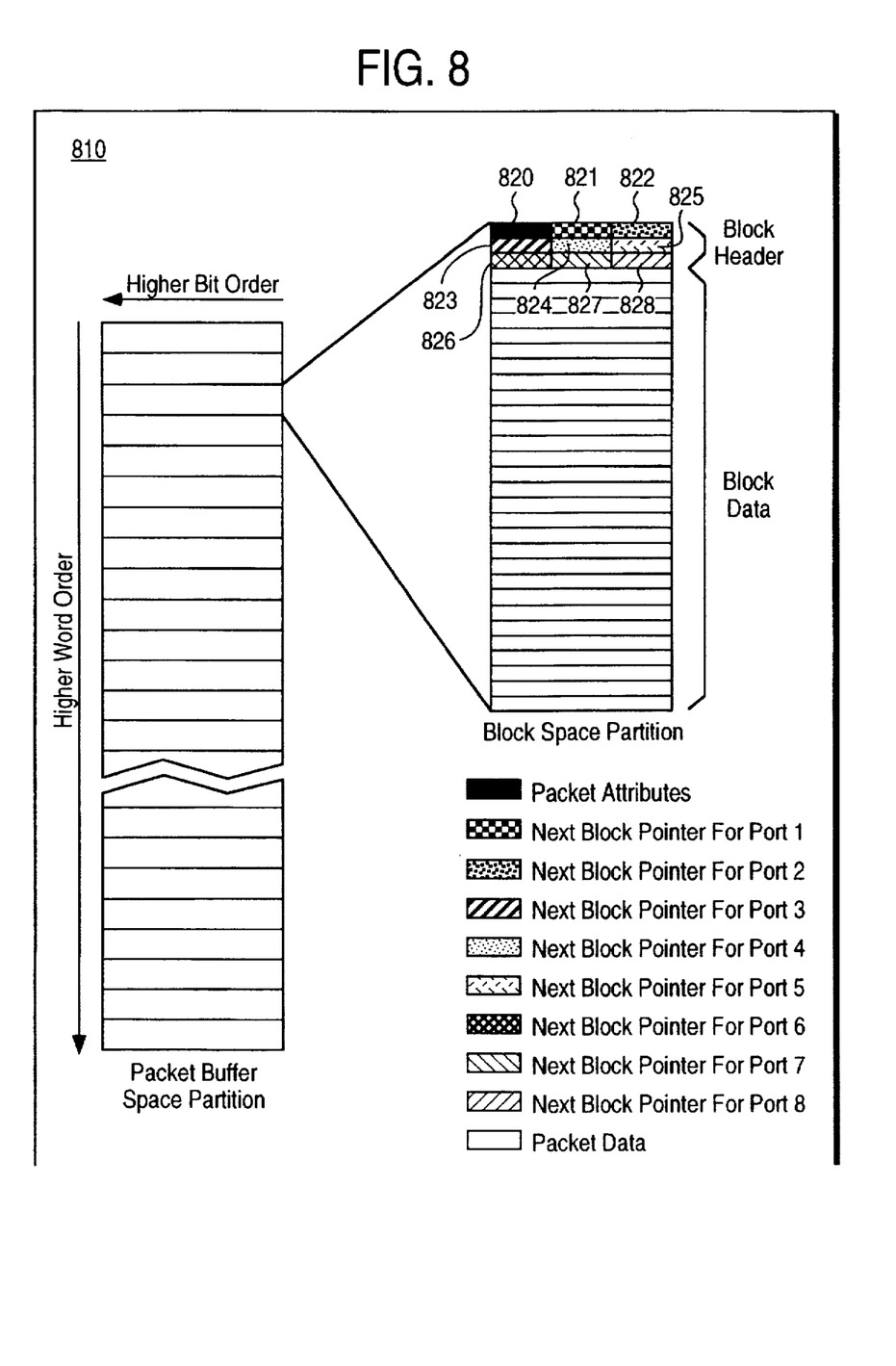
FIG. 8 is a graphical diagram of the packet buffer memory organization for the shared packet buffer memories in accordance with the present invention.

Referring now to FIG. 8, a conceptual diagram of the packet buffer memory organization is illustrated. The packet buffer memories 210 are partitioned into fixed-sized blocks 810. In the exemplary embodiment, each block is sized to be 32 words by 48 bits. The three lowest order words in a block comprise the block header. The rest of the words are used to store the packet data based on a simple ordering rule: the earlier the data bits are received, the higher order memory bit position it will be stored.

From the illustration of FIG. 8, it can be seen that the three word block header is treated as nine subword information spaces for control information. The first subword 820 defines packet attributes, which will be described more fully below with respect to FIG. 9. Subwords 821 to 828 respectively maintain next block pointer information corresponding to the eight ports associated with the packet processing unit 200 being served by the particular packet buffer memory 210. Since a data packet is stored only once for a given packet processing unit, and since the packet may be destined to be transmitted out of more than one port, the information is separately maintained about the next block pointer for each port when multiple ports may be transmitted. Since traffic considerations may affect the rate at which the packet is transmitted out from each of the possible ports, it is necessary to track where each port is in its transmission sequence.

Figure 9:
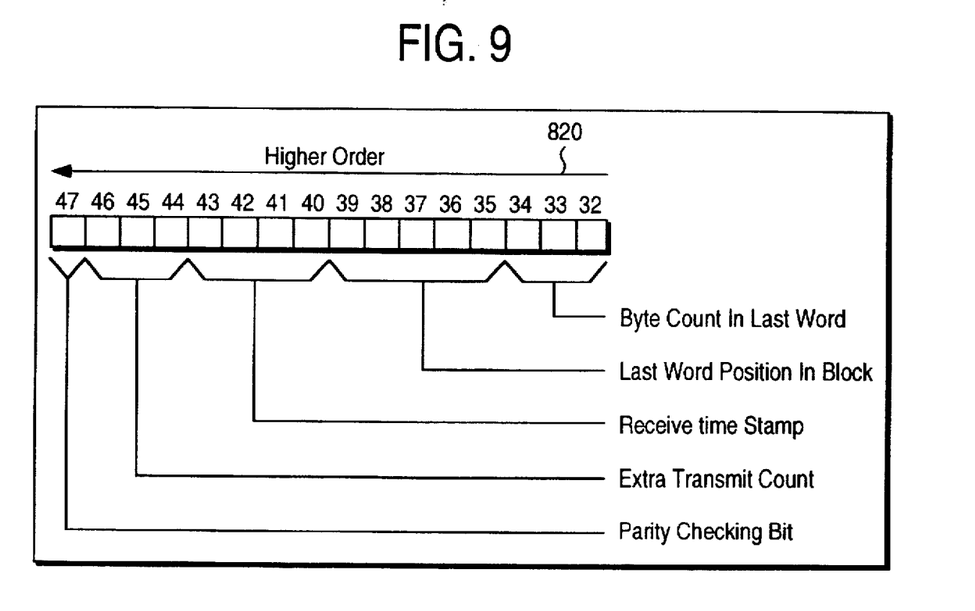
FIG. 9 is a more detailed diagram of one field in a packet buffer memory which identifies packet attributes in accordance with one aspect of the present invention.

FIG. 9 illustrates the bit assignments for the packet attribute portion 820 of a packet block in the packet buffer memory 210. The packet attribute portion constitutes the highest order 16 bits of the first word in the block header. The first bit (bit 47) comprises a Parity Checking Bit, which is used to protect the following 15 bits only. It is set so that the total number of "1"s in the 16-bit field is even. The Extra Transmit Count (bits 46–44) is used to indicate how many extra ports still have to transmit the packet. The Receive Time Stamp (bits 43–40) is used to record the time when the packet is received. The Last Word Position in Block (bits 39–35) is used to indicate the position of the last word within the block. If the block contains the last data portion of a packet, this field contains the actual last word position the data occupy. Otherwise, it is set to "00000" to indicate the block contains full words of data which are not the last data portion of the packet. Finally, the Byte Count in Last Word (bits 34–32) is used to indicate how many bytes are actually stored in the last word indicated by the word count in the last block.

As mentioned above, the field from bits 46–44 of the packet attributes 820 constituting the Extra Transmit Count is used to indicate how many ports should transmit the packet. If a packet is to be output on more than one port, then the extra transmit count equals the number of ports the packet is to be output on. As the MAC transmission control logic 761–768 completes transmitting the packet out of a particular port, it decrements the value stored in the transmit count. Once the last port has completed transmitting the packet, the extra transmit count has been decremented to zero and the link list pointers can be freed and the memory buffer space occupied by the packet can then be made available for allocation to another packet.

The exemplary Ethernet switch described above with respect to the present invention supports a cut-through packet transition mode. In the cut-through packet transition mode, whenever the destination port(s) is known for a packet being assembled, and there is no packet waiting in the transmission line for the destination port, the corresponding packet transmission logic will start transmitting the packet under the control of its media access controller (MAC), even while the packet is still being assembled. If another packet destined at the same port is done with assembly while the current packet transmission is still going on, it will be attached to the back of the packet transmission line. If there is any packet waiting in the packet transmission line, the newly-assembled packet should be attached at the end of the transmission line, and the packet at the head of the transmission line will be transmitted after the previous cut-through transmission is done.

With the cut-through packet transmission feature, a value may be specified indicating how much of a packet should be received before cut-through transmission begins. A minimum starting point can be adjusted by changing the value of a cut-through minimum start limit value in a system configuration register to which the MAC Tx controllers are responsive. This allows software to dynamically change the minimum cut-through latency according to the traffic situation to control or minimize the runt leak-through rate.

While the above dynamically adjustable cut-through transmission is defined at the packet processing unit level for all ports associated with a packet processing unit, in an alternative embodiment, a separate register could be defined for each port, such that each port associated with a packet processing unit may have a different cut-through latency in accordance with separate traffic conditions for each port.

Upon finishing transmitting a packet, the packet transmission logic will return the blocks containing the packet data just transmitted by queuing a block return request with information about the first and last block location in the block return queue managed by the free linked list control logic 740. The block return logic will read the block header of the first request to check if the extra transmit count has decremented to "000". If so, it will attach the associated block list at the end of the free linked list pool. Otherwise, it will be responsible for decrementing the extra transmit count by one and appropriately updating the block header.

The Management Information Base (MIB) Bus

Referring back now to FIG. 2, it was discussed above that in addition to incorporating the cell bus 220 within the exemplary Ethernet switch, there is also provided a management information-based (MIB) bus 260 for providing control traffic within the workgroup switch. The MIB bus 260 is designed to function with a companion MIB counter 265, which accumulates various port MIB count information and allocates the MIB bus cycles. In accordance with the exemplary embodiment, all the devices connected on the MIB bus 260 are synchronized with the system clock running at 20 Mhz. More specifically, all signals on this bus are asserted at the rising edge of the clock, and latched by each device at the rising edge of the clock. In addition, the MIB counter should be synchronized to a 10 Mhz clock in the same phase as the cell bus cycle described above. The arbitration scheme for this bus is similar to the one used for the cell bus, but the arbitration is independent of the cell bus arbitration.

As with the cell bus 220, the MIB bus 260 is a cell-based bus architecture. Cells transmitted on the MIB bus 260 are defined to be 22-bit data units transferred by each of the packet processing units for carrying the MIB information for each local port to the MIB counter 265 to accumulate various MIB count information. It requires two system clock cycles to send a MIB cell, with bits 21–11 being sent first and bits 10–0 being sent second.

Figure 10:
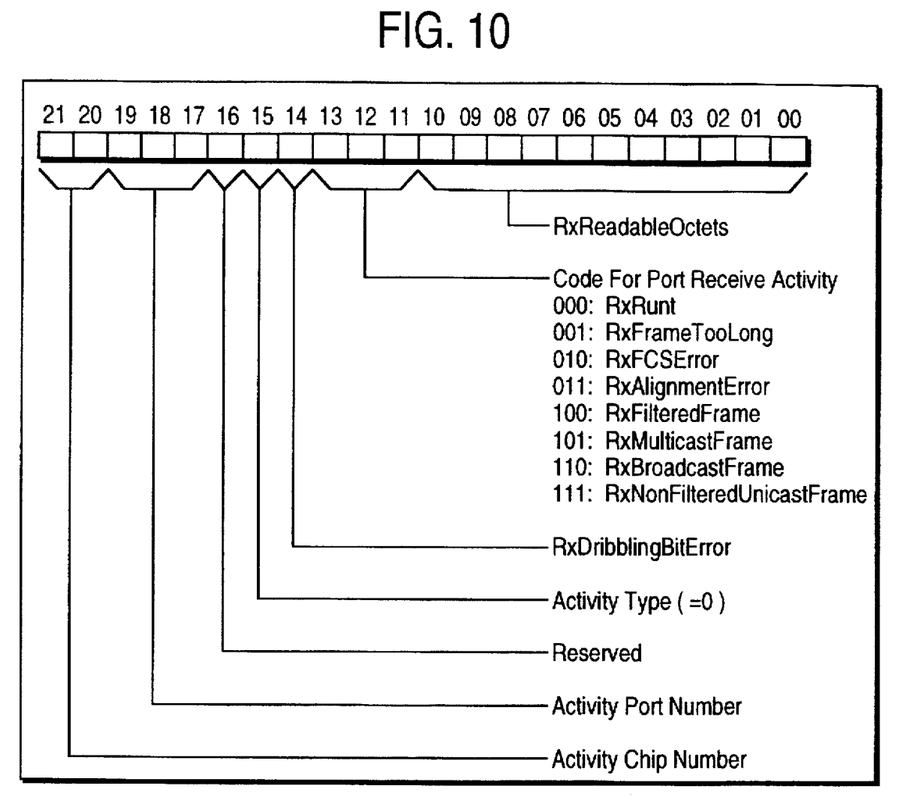
FIG. 10 illustrates the bit assignments for cells to be transmitted over a cell-based control bus for ports exhibiting receive activity.

The format for a MIB cell transmitted on the MIB bus for a port exhibiting receive activity is illustrated in FIG. 10. Bits 21–17 together provide the identification of the packet processing unit and the source port with the receive activity being described by the current MIB cell. The setting of the activity type (bit 15) indicates that the activity on the port is receive activity when the bit is set to "0". When bit 14 is set to "1", it is indicated that the received frame does not end on a byte boundary.

Bits 13–11 indicate a code for the port receive activity. When the value of those three bits is "111", it is indicated that the frame is received correctly, is of unicast type, and is not filtered by the switch. A setting of "110" indicates that the frame is received correctly, is a broadcast frame, and is not filtered by the switch. A setting of "101" indicates that the frame is received correctly, is a multicast frame and is not filtered by the switch. A setting of "100" indicates that the frame has been correctly received, but is filtered by the switch. A setting of "011" indicates that the frame is received with valid frame length, but with a CRC error and the dribbling bit error. A setting of "010" indicates that the frame was received with the valid frame length, but there was no dribbling bit error, but there was a CRC error, which is checked on the byte boundary. A "001" indicates that the frame is received with a frame length of more than 1518 , bytes indicating it is too long to be a valid Ethernet packet. Finally, a "000" indicates that the frame is received with a frame length of less than 64 bits and is referred to as a runt frame. Bits 10–0 are used to indicate the byte count contained in the frame when the frame is received correctly.

Figure 11:
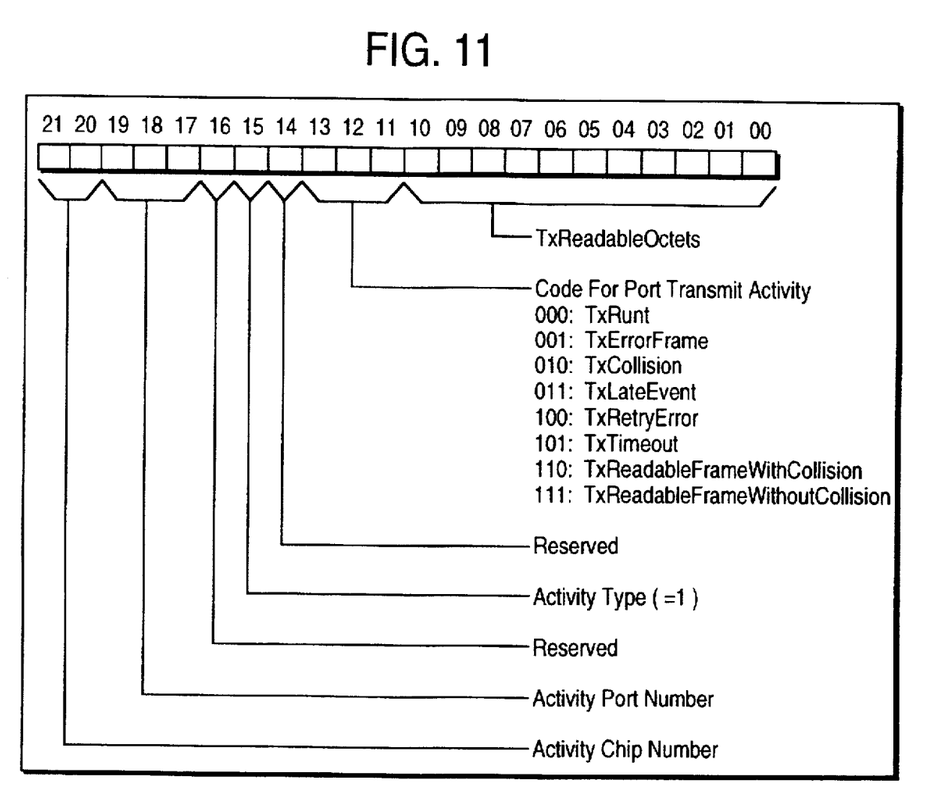
FIG. 11 illustrates the bit assignments for the format of a control bus cell for ports exhibiting transmit activity in accordance with the present invention.

Referring now to FIG. 11, the format of a MIB cell for a port with transmit activity is illustrated. Again, bits 21–17 indicate the source packet processing unit and source port for which the activity is being reported. A setting of "1" at bit 15 indicates that the activity is transmit activity. Bits 13-11 define a code for the port transmit activity. A "111" indicates that a packet with a correct frame is transmitted out successfully the first time without a backoff caused by a collision. A setting of "110" indicates that a packet of correct frame format was transmitted out successfully, but with previous backoffs caused by collision activity. A setting of "101" indicates that the packet was discarded because it stayed in the packet buffer for longer than the maximum packet delay allowed by the switch. A setting of "100" indicates that the packet was discarded because the media access controller had experienced more than 15 collisions during the transmit effort for this packet. The number of collisions allowable can be varied in alternative configurations. A setting of "011" indicates that a collision had occurred after the port had transmitted more than 64 bytes of data. A setting of "010" indicates that a collision occurred before the port had transmitted more than 64 bytes of data. A setting of "001" indicates that a packet with an alignment error, CRC error or FrameTooLong errors has been transmitted. Finally, a setting of "000," indicates that a packet with a frame length of 64 bytes or less has been transmitted, a runt packet. The values for bits 10–0 are used to indicate the byte count contained in the transmitted packets when no error has been encountered.

There has thus been described an exemplary embodiment of an Ethernet workgroup switch which implements a packet processing unit for efficiently handling data packet traffic and routing techniques. Although the present invention has been described in terms of exemplary and implemented embodiments, it should be understood by those of ordinary skill in the art that many of techniques and aspects of the present invention are suitable for use in other network communication devices. Accordingly, the spirit and scope of the present invention should be measured in terms of the claims which follow.

What is claimed is:

1. A network data communication apparatus comprising:

a first port coupled to receive an incoming network data packet;

a data packet segmentation unit in communication with said first port for segmenting said incoming data packet into a plurality of fixed-size data cells;

a cell bus in communication with said data packet segmentation unit for conveying said fixed-sized data cells;

a data packet reassembly unit in communication with said cell bus for receiving said data cells and for reassembling said data cells into a network data packet;

a second port in communication with said data packet reassembly unit for transmitting said network data packet from said data communication apparatus;

a first additional plurality of ports each in communication with said data packet segmentation unit, said first additional plurality of ports coupled to receive incoming network data packets from a plurality of network source addresses;

a second additional plurality of ports each in communication with said data packet reassembly unit, said second additional plurality of ports coupled to transmit reassembled data packets to a plurality of network destination addresses;

a routing control unit in communication with said cell bus for monitoring data cell traffic on said cell bus and determining an output port(s) for network data packets, said routing control unit providing destination control packets for said data packet reassembly unit;

a routing table memory in communication with said routing control unit, said routing table memory for storing a data table of said network source addresses and the ports associated with said source addresses;

a control bus in communication with all of said ports of said network data communication apparatus for receiving port status data cells relating to activity associated with each of said ports;

a port status counter coupled to said control bus for accumulating said port status data cells;

an I/O bus;

bus bridging circuitry coupled between said I/O bus and said cell bus for conveying data traffic therebetween;

a high-speed network controller coupled to said I/O bus; and a high-speed network interface coupled to said high-speed network controller for coupling said network data communication apparatus to a high-speed network.

2. The network data communication apparatus of claim 1 further comprising a microprocessor in communication with said I/O bus for handling network management protocols for said network data communication apparatus.

3. A network data communication apparatus comprising:

a first port coupled to receive an incoming network data packet;

a data packet segmentation unit in communication with said first port for segmenting said incoming data packet into a plurality of fixed-size data cells, said data packet segmentation unit comprising:

a data packet synchronizer for synchronizing a received data packet to a clock signal associated with said network data communication apparatus;

a cell header generator coupled to analyze said data packet for generating cell headers for data cells constituting said data packet, said cell header generator comprising:

a field classifier for classifying a field type of said data cell;

a byte counter for counting bytes in a data bit stream constituting said data packet;

a CRC checker operating on said data bit stream; and a cell header register coupled to said field classifier, byte counter, and CRC checker for storing cell header bits responsive to each of said classifier, counter, and checker, respectively, said cell header bits for generating said cell headers;

a cell payload generator coupled to receive said data packet and divide it into fixed-size cell payloads for inclusion with said data cells on said cell bus;

a cell header and cell payload combiner in communication with said header generator and said payload generator for combining cell headers with cell payloads to generate data cells for transmission on said cell bus; and cell transmission circuitry coupled to receive data cells from said combiner for transmission onto said cell bus;

a cell bus in communication with said data packet segmentation unit for conveying said fixed-sized data cells;

a data packet reassembly unit in communication with said cell bus for receiving said data cells and for reassembling said data cells into a network data packet;

a second port in communication with said data packet reassembly unit for transmitting said network data packet from said data communication apparatus;

a first additional plurality of ports each in communication with said data packet segmentation unit, said first additional plurality of ports coupled to receive incoming network data packets from a plurality of network source addresses; and a second additional plurality of ports each in communication with said data packet reassembly unit, said second additional plurality of ports coupled to transmit reassembled data packets to a plurality of network destination addresses.

4. The network data communication apparatus of claim 3 wherein said cell payload generator comprises:

a serial-in/parallel-out (SIPO) register for serially receiving sequential bits of said data packet for outputting fixed-size cell payloads; and a cell payload register coupled to said SIPO register for receiving and holding said fixed-size cell payloads.

5. The network data communication apparatus of claim 4 wherein said cell header and payload combiner comprises:

a cell transmission multiplexer coupled to said cell header register and said cell payload register for selecting a cell header and its corresponding cell payload; and a bus output register coupled to said cell transmission multiplexer for holding a combined fixed-size data cell prior to transmission on said cell bus.

6. The network data communication apparatus of claim 5 wherein said cell transmission circuitry comprises:

a bus access controller for requesting cell bus access and for generating a transmission enable signal; and a bus driver coupled to said bus output register and responsive to said transmission enable signal for conveying said data cell onto said cell bus.

7. The network data communication apparatus of claim 6 wherein said bus driver successively conveys first half of the fixed-size data cell then the rest of the fixed-size data cell onto said cell bus.

8. A network data communication apparatus comprising:

a first port coupled to receive an incoming network data packet;

a data packet segmentation unit in communication with said first port for segmenting said incoming data packet into a plurality of fixed-size data cells, said data packet segmentation unit comprising:

a data packet synchronizer for synchronizing a received data packet to a clock signal associated with said network data communication apparatus;

a cell header generator coupled to analyze said data packet for generating cell headers for data cells constituting said data packet;

a cell payload generator coupled to receive said data packet and divide it into fixed-size cell payloads for inclusion with said data cells on said cell bus;

a cell header and cell payload combiner in communication with said header generator and said payload generator for combining cell headers with cell payloads to generate data cells for transmission on said cell bus; and cell transmission circuitry coupled to receive data cells from said combiner for transmission onto said cell bus;

a cell bus in communication with said data packet segmentation unit for conveying said fixed-sized data cells;

a data packet reassembly unit in communication with said cell bus for receiving said data cells and for reassembling said data cells into a network data packet, said data packet reassembly unit comprising:

packet assembly linked list control logic for directing the storage of cell data into a packet buffer memory, which is in communication with said data packet reassembly unit, for reassembly of said data packet; and free linked list control logic for assigning blocks of memory in said packet buffer memory for storage of said data packet, wherein the first block of memory for a given data packet is for storing information about the number of ports associated with said packet buffer memory said data packet is to be transmitted from;

a second port in communication with said data packet reassembly unit for transmitting said network data packet from said data communication apparatus;

a first additional plurality of ports each in communication with said data packet segmentation unit, said first additional plurality of ports coupled to receive incoming network data packets from a plurality of network source addresses; and a second additional plurality of ports each in communication with said data packet reassembly unit, said second additional plurality of ports coupled to transmit reassembled data packets to a plurality of network destination addresses.

9. The network data communication apparatus of claim 8 further comprising media access control transmission logic in communication with said second port and said packet reassembly unit for directing transmission of said data packet from said packet buffer memory to said network, said transmission logic notifying said free linked list logic upon transmission of a packet for freeing blocks of memory in said packet buffer memory.

10. The network data communication apparatus of claim 9 wherein said media access control transmission logic initiates the transmission of a data packet prior to complete reassembly in accordance with a dynamically configurable cut-through transmission parameter.

11. A network switch comprising:

a first plurality of ports each for receiving and transmitting network data packets;

a first packet processing unit in communication with said first plurality of ports for segmenting data packets received from said first plurality of ports into fixed-size data cells and for reassembling fixed-size data cells into data packets for transmission from at least one of said first plurality of ports;

a first packet buffer memory coupled to said first packet processing unit for storing data packets as they are reassembled until they can be transmitted from at least one of said first plurality of ports;

a cell bus coupled to said first packet processing unit for conveying said data cells;

a second plurality of ports, each for receiving and transmitting network data packets;

a second packet processing unit coupled between said second plurality of ports and said cell bus, said second packet processing unit for segmenting data packets received on one of said second plurality of ports and for reassembling data packets to be transmitted from at least one of said second plurality of ports;

a switch packet routing control unit coupled to said cell bus for propagating control cells to said packet processing units for identifying which of said first and second plurality of ports said data packet is to be transmitted from, said routing control unit monitoring data cell traffic on said cell bus for associating ports with network addresses; and a routing table memory coupled to said switch packet routing control unit for maintaining a table of network addresses associated with each of said first and second plurality of ports;

an I/O bus;

bus bridging circuitry coupled between said I/O bus and said cell bus for conveying data traffic therebetween;

a high-speed network controller coupled to said I/O bus; and a high-speed network interface coupled to said high-speed network controller for coupling said network data communication apparatus to a high-speed network.

12. The network switch of claim 11 further comprising a microprocessor in communication with said I/O bus for handling network management protocols for said network switch.

13. A method of switching data packets in a network comprising the steps of:

receiving a data packet on a first network port;

segmenting said data packet into a plurality of fixed-size cells, including the steps of:
synchronizing the receipt of said data packet with an internal clock signal;
dividing the data packet into fixed-size cell payloads;
generating cell headers in accordance with an associated cell payload; and
combining a cell header with an associated cell payload to constitute a fixed-size cell;

propagating said fixed-size cells to a packet reassembly unit associated with a second network port, including the step of transmitting said fixed-size cells onto a cell bus;

reassembling said fixed-size cells into a reassembled network data packet, including the steps of:
receiving the fixed-size cells constituting a data packet; and
storing the cells in a packet buffer memory associated with said second network port in an order that reassembles the data packet, including the steps of:
allocating blocks of said packet buffer memory as needed for storage of said data packet;
maintaining a free pool of pointers to free memory blocks available for allocation in said packet buffer memory; and
tracking the number of output ports a data packet remains to be transmitted from;

transmitting said reassembled network data packet from said second network port; and transmitting said reassembled network data packet from an additional plurality of network ports.

14. The method according to claim 13 wherein said transmitting said reassembled network data packet step comprises the steps of:

decrementing a counter value for the number of ports a packet remains to be transmitted from upon transmission of a data packet from one port; and freeing blocks of said packet buffer memory associated with a data packet after said data packet has been transmitted from all its destination ports.

15. The method according to claim 14 further comprising the steps of:

each port reporting activity information; and accumulating port activity information at a central location.

* * * * *